United States Patent [19]
Woods

[11] Patent Number: 5,365,978
[45] Date of Patent: Nov. 22, 1994

[54] TOP ENTRY FLOW CONTROL VALVE WITH TWO SETS OF ORIFICES

[75] Inventor: John B. Woods, Tulsa, Okla.

[73] Assignee: Baker Hughes Incorporated, San Antonio, Tex.

[21] Appl. No.: 56,559

[22] Filed: May 3, 1993

Related U.S. Application Data

[63] Continuation-in-part of Ser. No. 919,687, Jul. 27, 1992, Pat. No. 5,217,046.

[51] Int. Cl.⁵ .............................................. F16K 3/00
[52] U.S. Cl. .............................. 137/614.11; 137/316; 137/454.6; 137/625.3; 137/625.31; 251/208
[58] Field of Search ........... 137/614.11, 625.3, 625.31, 137/454.6, 316; 251/208

[56] References Cited

U.S. PATENT DOCUMENTS

| | | | |
|---|---|---|---|
| 880,127 | 2/1908 | Cramer | 137/625.31 |
| 3,792,872 | 2/1974 | Jones | 251/209 X |
| 4,098,294 | 7/1978 | Woods | 137/614 |
| 4,331,176 | 5/1982 | Parkison | 137/614.11 X |
| 4,603,834 | 8/1986 | Hendrick | 251/121 |
| 4,901,977 | 2/1990 | Hendrick | 251/249 |
| 4,967,787 | 11/1990 | Taylor | 137/316 |
| 5,020,568 | 6/1991 | Taylor | 137/316 |
| 5,025,832 | 6/1991 | Taylor | 137/625 |
| 5,025,833 | 6/1991 | Hendrick | 137/625 |
| 5,054,521 | 10/1991 | Hendrick | 137/625 |
| 5,063,954 | 11/1991 | Hendrick | 137/625 |
| 5,088,689 | 2/1992 | Hendricks | 251/304 |
| 5,217,046 | 6/1993 | Woods | 137/614.11 |

Primary Examiner—Gerald A. Michalsky
Attorney, Agent, or Firm—Dunlap, Codding & Lee

[57] ABSTRACT

A top entry flow control valve having a body with an inlet port, an outlet port and an access opening. The body has a cavity connected with the access opening and communicating with the inlet port and outlet port to allow fluid flow through the valve body. A pair of discs with orifices are positioned within the cavity to control flow into the outlet port by rotating one of the discs to change the degree of alignment between the disc orifices. A sleeve, a wear sleeve and a rotatable cylinder are located within the cavity to control flow from the inlet port. The sleeve and the cylinder both have side walls with a set orifices. One disc is secured within the open end of the rotatable cylinder and the other disc is secured to the wear sleeve. By rotating the cylinder, the alignments of the sleeve orifices with the cylinder orifices and of the orifices of the two discs are changed to control flow through the valve. A cover is removably attached over the access opening and secures the sleeve, the cylinder, the wear sleeve and the discs in the cavity. The cylinder and wear sleeve have sets of flanges or threads which cooperate to allow the cylinder and wear sleeve to be installed into and removed from the valve body separately or together. The valve may also be constructed without the sleeve.

11 Claims, 11 Drawing Sheets

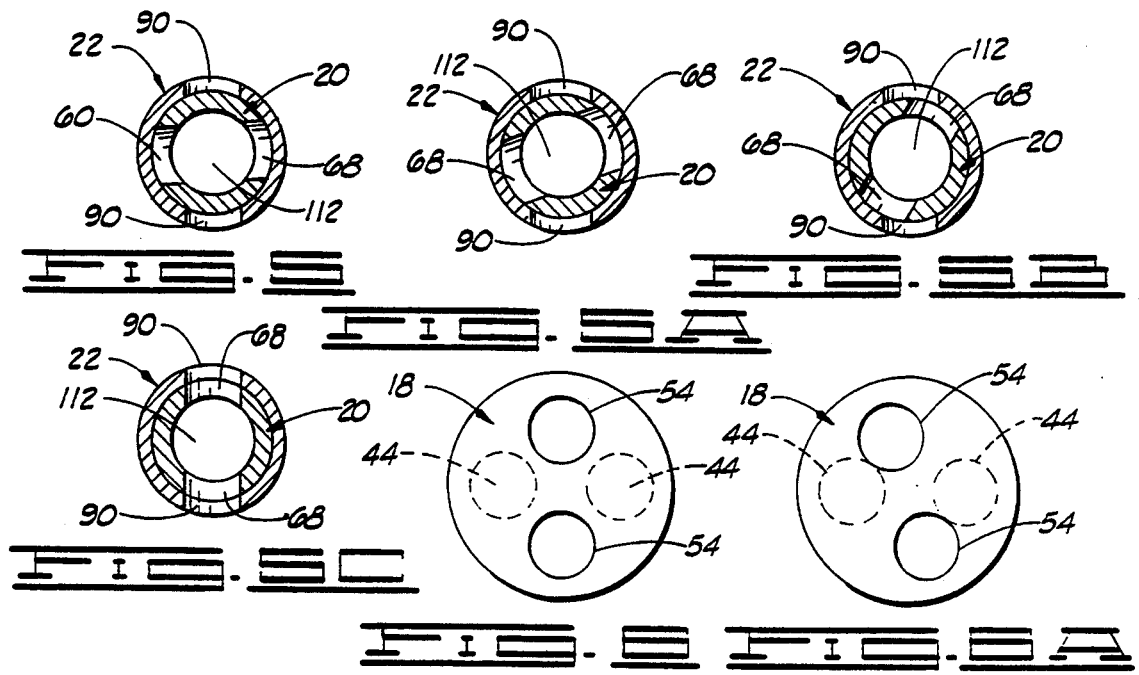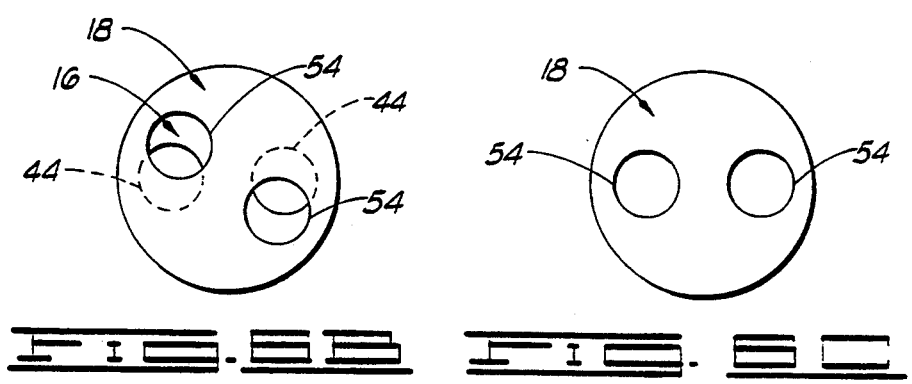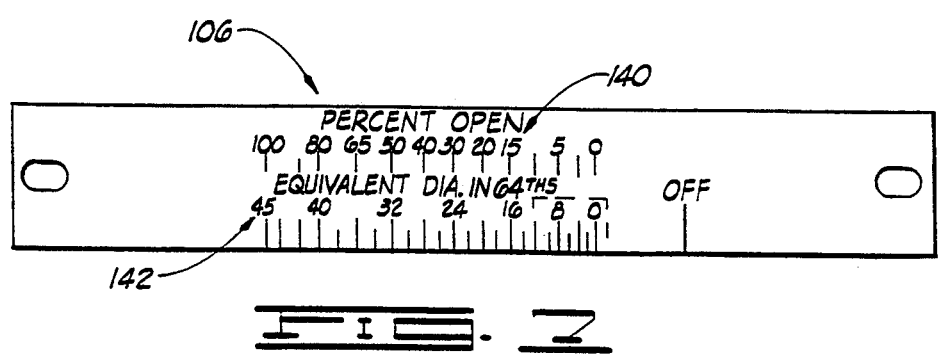

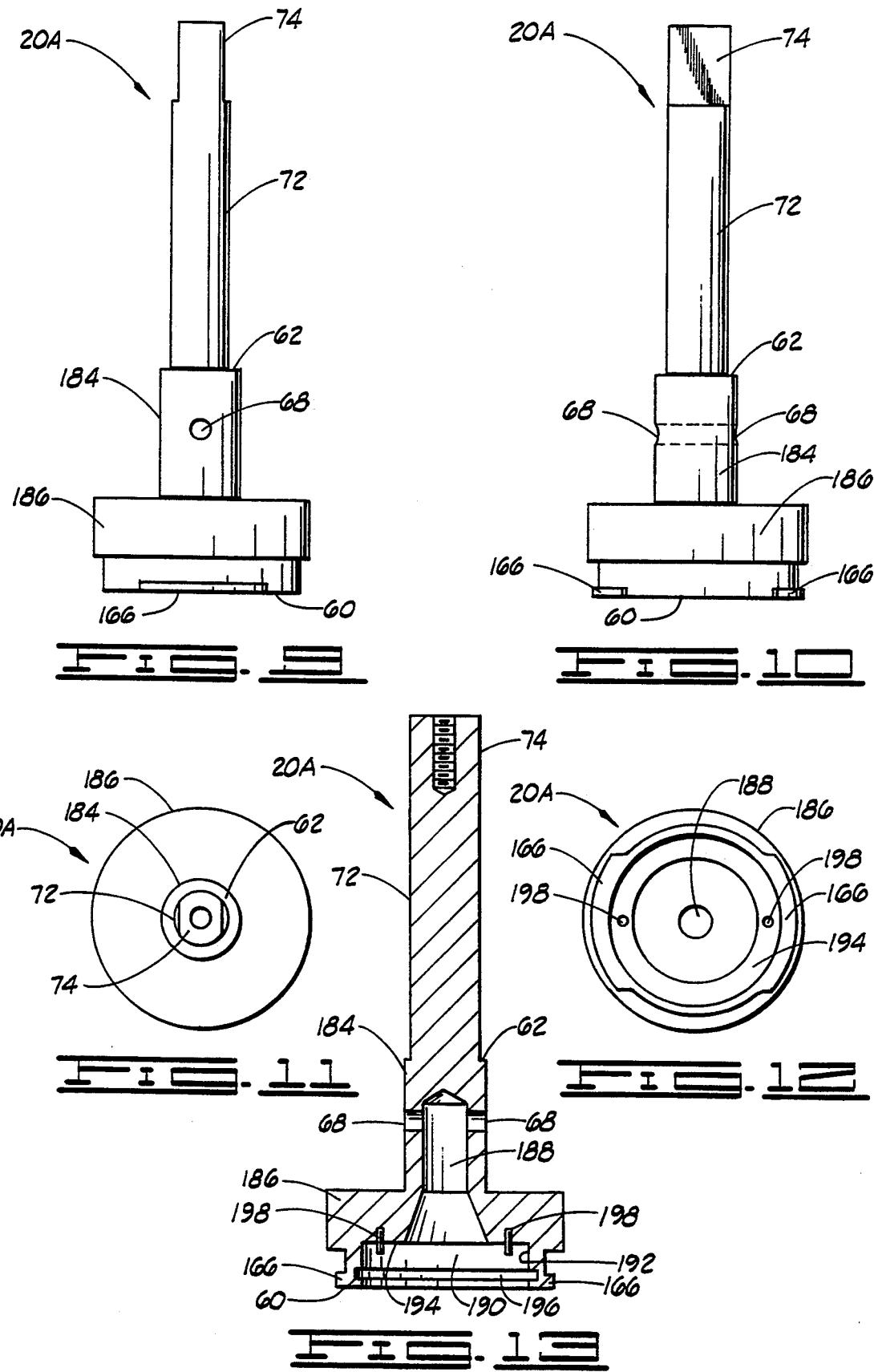

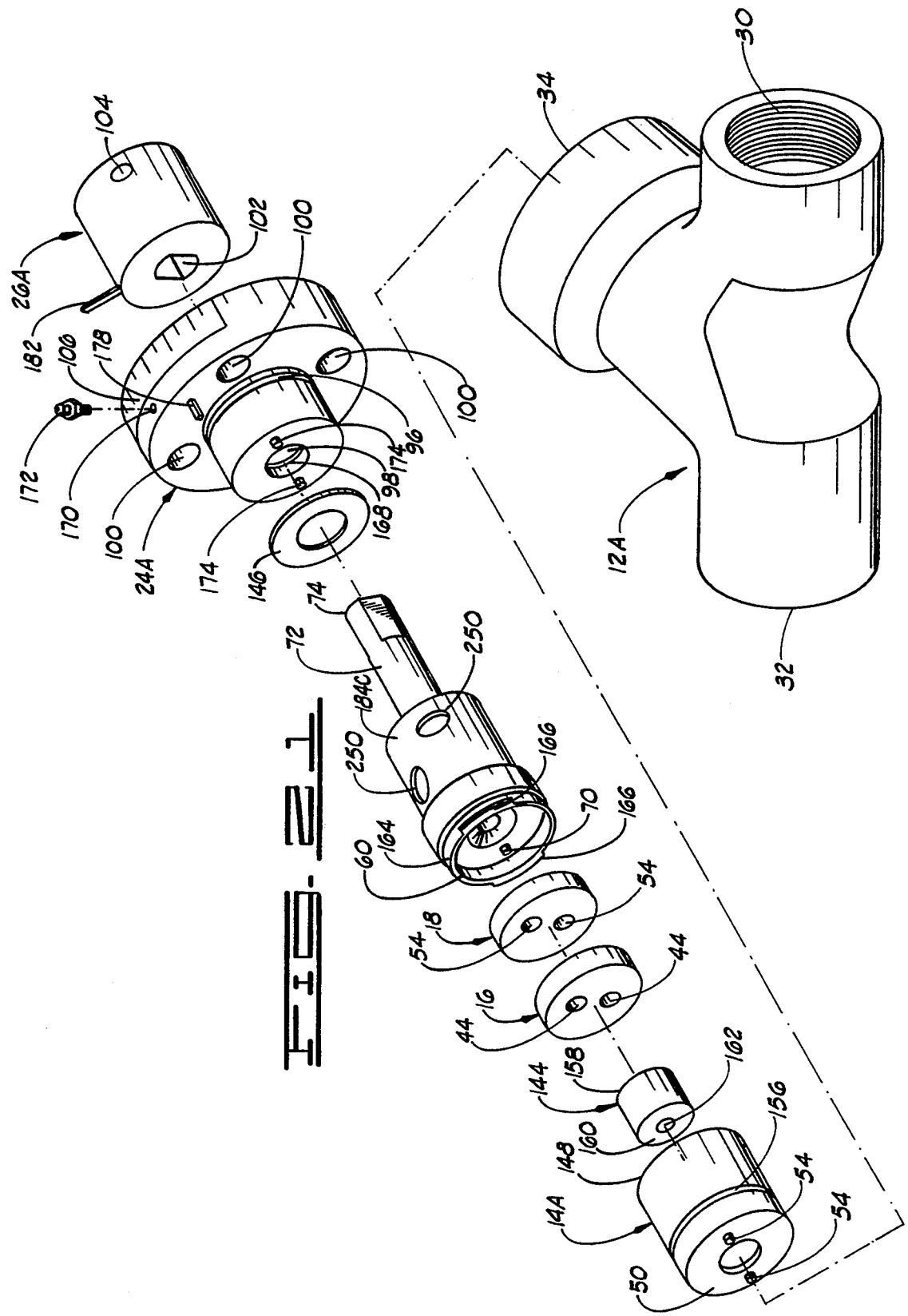

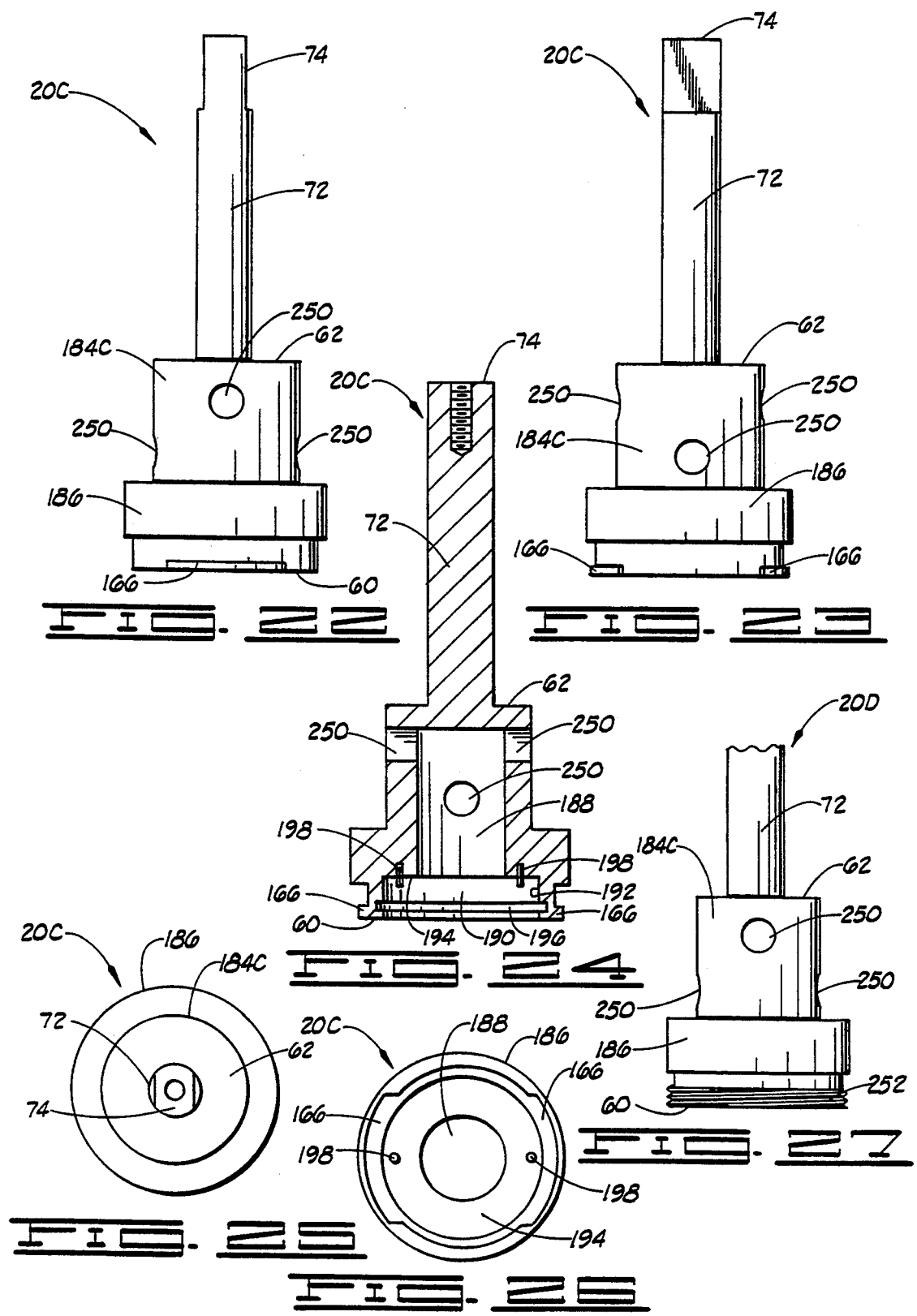

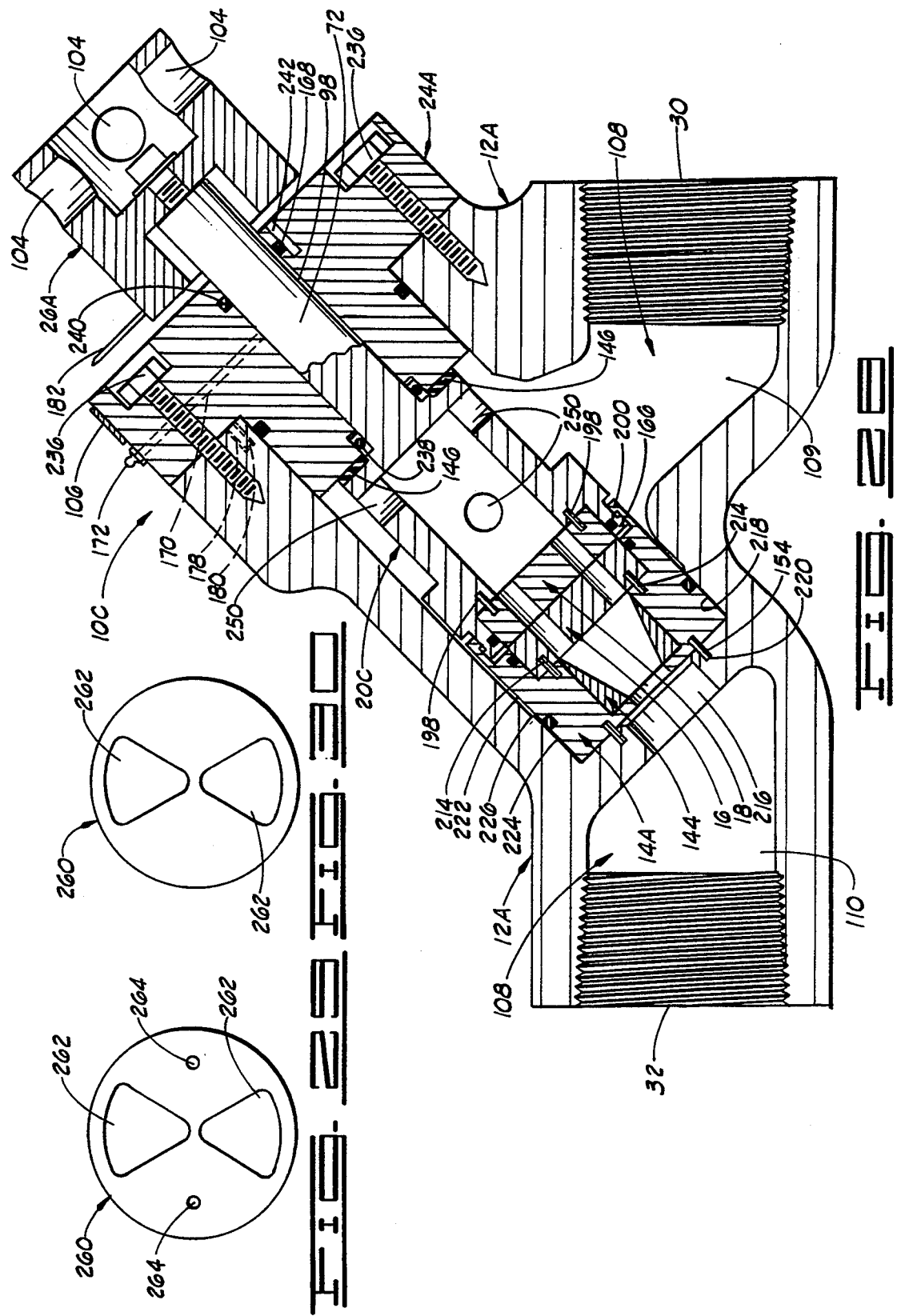

5,365,978

TOP ENTRY FLOW CONTROL VALVE WITH TWO SETS OF ORIFICES

CROSS-REFERENCE TO RELATED APPLICATIONS

This application is a continuation-in-part of U.S. Ser. No. 919,687, filed Jul. 27, 1992 and entitled "TOP ENTRY FLOW CONTROL VALVE WITH TWO SETS OF ORIFICES," now U.S. Pat. No. 5,217,046.

FIELD OF THE INVENTION

The present invention relates generally to flow control or choke valves and, more particularly, but not by way of limitation, to top entry flow control valves with two sets of orifices.

SUMMARY OF THE INVENTION

The present invention comprises a valve body with an inlet port, an outlet port and a sidewall with an access opening. The body has a cavity which connects with the access opening and has fluid communication between the inlet port and the outlet port to allow fluid flow through the body of the valve.

A stationary disc and a rotatable disc are positioned in engagement with one another in the cavity to control flow to the outlet port. A plurality of orifices extend through each disc. As the rotatable disc is turned, the degree of alignment between the disc orifices is altered and the fluid flow allowed through the disc orifices to the outlet port is changed.

A sleeve and rotatable cylinder are positioned within the cavity to control flow from the inlet port. The sleeve is secured to the body within the cavity and has a bore which matingly receives the rotatable cylinder. The sleeve has a sidewall with a plurality of orifices extending into the bore of the sleeve.

The rotatable cylinder has a closed end and an open end extending into the cylinder to form a chamber within the cylinder. The cylinder has a sidewall with a plurality of orifices extending into the chamber. As the cylinder is turned, the area of alignment between the orifices of the cylinder and sleeve is changed to adjust the fluid flow from the inlet port into the chamber.

The valve has a cover which is bolted over the access opening and secures the sleeve, cylinder and discs in place within the cavity of the valve body. A valve stem is attached to the rotatable cylinder and extends through the cover to allow adjustment of the flow position of the valve. The cylinder, in turn, is attached to the rotatable disc to provide simultaneous rotation of the cylinder and rotatable disc.

A hub is attached to the end of valve stem, which protrudes through the cover. A pair of cross bores extend through the hub for insertion of a bar to facilitate turning the hub and, in turn, the valve stem. An indicator band is fastened to the hub to provide a visual indication of the flow control position of the valve.

One object of the present invention is to provide a flow control valve which can be readily serviced, either to make repairs or to change orifice sizes, without removing the valve from the flow line.

Another object of the present invention is to provide a flow control valve having simultaneously adjustable inlet and outlet orifices, dividing pressure drop through the valve into two stages.

Other objects, advantages and features of the present invention are apparent from the following detailed description when read in conjunction with the accompanying drawings and appended claims.

BRIEF DESCRIPTION OF THE DRAWINGS

FIG. 5 is a cross-sectional view taken along lines 5—5 of FIG. 3 wherein the orifices of the sleeve and the orifices of the cylinder are in a closed position.

FIG. 5a is the same view as FIG. 5, but with the cylinder rotated to place the orifices of the sleeve and the cylinder in a nearly open position.

FIG. 5b is the same view as FIG. 5, but with the cylinder rotated to place the orifices of the sleeve and the cylinder in a half open position.

FIG. 5c is the same view as FIG. 5, but with the cylinder rotated to place the orifices of the sleeve and the cylinder in a fully open position.

FIG. 6 is a cross-sectional view along lines 6—6 of FIG. 3 wherein the orifices of the stationary disc and the orifices of the rotatable disc are in a closed position.

FIG. 6a is the same view as FIG. 6, but with the rotatable disc turned to place the orifices of the rotatable and stationary discs in a nearly open position.

FIG. 6b is the same view as FIG. 6, but with the rotatable disc turned to place the orifices of the rotatable and stationary discs in a half open position.

FIG. 6c is the same view as FIG. 6, but with the rotatable disc turned to place the orifices of the rotatable and stationary discs in a fully open position.

FIG. 7 is a plan view of the flow position indicator band of the flow control valve shown in FIG. 1.

FIG. 9 is a side elevation of the rotatable cylinder in the valve of FIG. 8 showing a side of the rotatable cylinder having a cylinder flange.

FIG. 10 is a side elevation of the rotatable cylinder in the valve of FIG. 8 showing a side of the rotatable cylinder between two cylinder flanges.

FIG. 11 is a top plan view of the rotatable cylinder of FIG. 9.

FIG. 12 is a bottom plan view of the rotatable cylinder of FIG. 9.

FIG. 13 is a cross-sectional view of FIG. 10.

FIG. 21 is an exploded, perspective view of another alternate embodiment of a flow control valve constructed in accordance with the present invention.

FIG. 22 is a side elevation of the rotatable cylinder in the valve of FIG. 21 showing a side of the rotatable cylinder having a cylinder flange.

FIG. 23 is a side elevation of the rotatable cylinder of FIG. 22 showing a side of the rotatable cylinder between two cylinder flanges.

FIG. 24 is a cross-sectional view of FIG. 23.

FIG. 25 is a top plan view of the rotatable cylinder of FIG. 22.

FIG. 26 is a bottom plan view of the rotatable cylinder of FIG. 22.

FIG. 27 is a side elevation of a portion of an alternate, threaded embodiment of the rotatable cylinder of FIG. 22.

FIG. 28 is partly diagrammatical, partly sectional view of the valve of FIG. 21 assembled for operation.

FIG. 29 is a top plan view of a disc having triangular orifices.

FIG. 30 is a bottom plan view of the disc of FIG. 27.

DETAILED DESCRIPTION OF THE PREFERRED EMBODIMENTS

Figure 1:
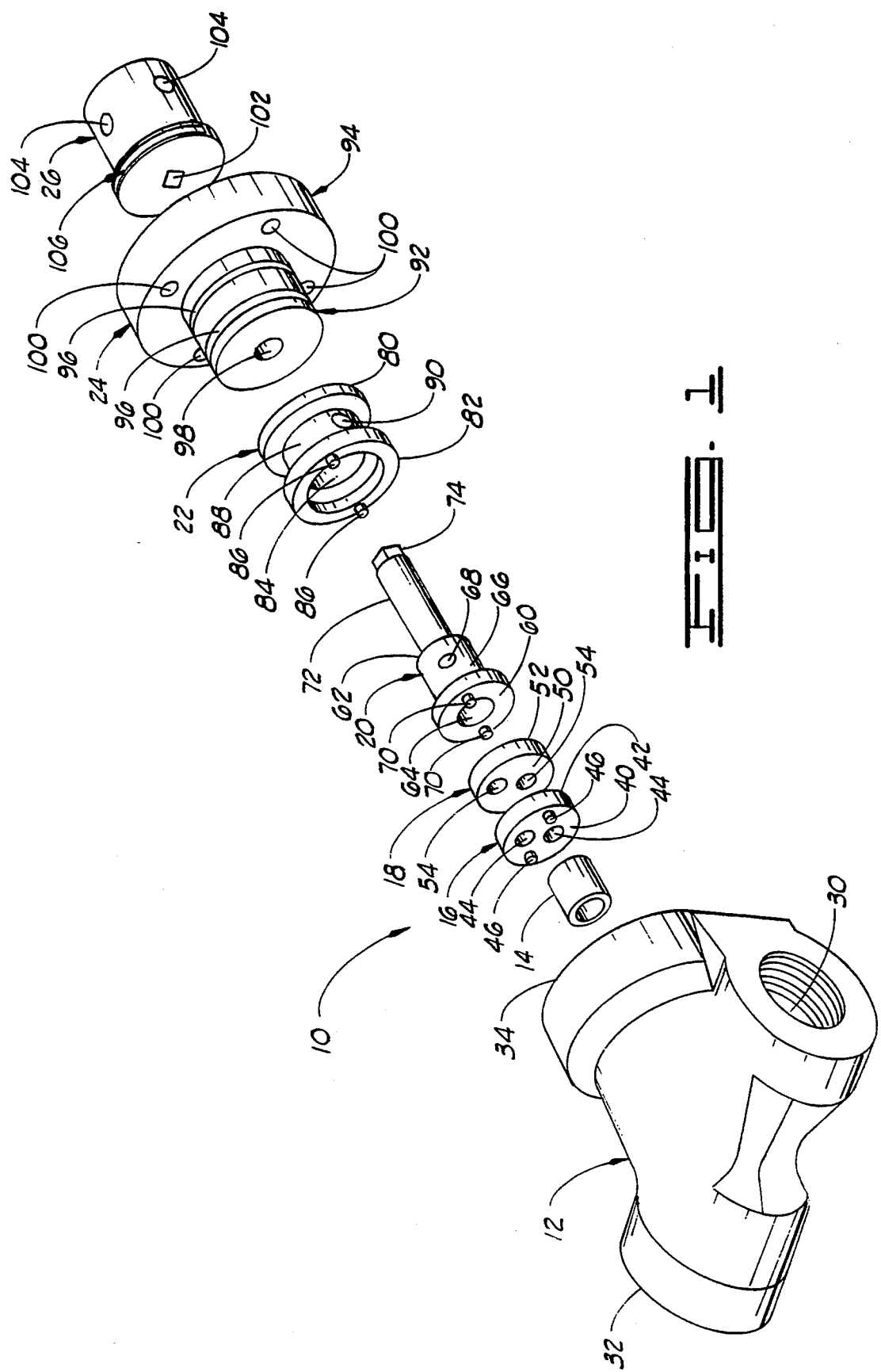
FIG. 1 is an exploded, perspective view of a flow control valve constructed in accordance with the present invention.

Referring to the drawings in general, and to FIG. 1 in particular, shown therein and designated by the general reference numeral 10 is a flow control valve which includes a body 12, a wear sleeve 14, a stationary disc 16, a rotatable disc 18, a rotatable cylinder 20, a sleeve 22, a cover 24 and a hub 26.

The body 12 includes an inlet port 30, an outlet port 32 and an access opening 34 for top entry into the valve body 12. As illustrated by FIG. 1, the wear sleeve 14, the stationary disc 16, the rotatable disc 18, the rotatable cylinder 20 and sleeve 22 are insertable into the body 12 through the access opening 34.

The wear sleeve 14, a tubular cylinder of stainless steel or the like, is placed in the valve body 12 first. The wear sleeve 14 may be used to prevent cavitation of the inside walls of the valve body 12 by high fluid pressure drop.

With continued reference to FIG. 1, the stationary and rotatable discs 16 and 18 are next positioned within the valve body 12. The stationary and rotatable discs 16 and 18 are typically made of ceramic or tungsten carbide. When installed in the valve body 12, the adjacent circular faces of the discs 16 and 18 are in engagement with one another.

The stationary disc 16 has an outlet side 40 facing the wear sleeve 14 and an inlet side 42 engaging the rotatable disc 18. A pair of orifices 44 extend through the stationary disc 16 and a pair of pins 46 extend from the outlet side 40 of the stationary disc 16. The pins 46 extend into pin openings within the valve body 12 to prevent rotation of the stationary disc 16. When installed in the valve body 12, the orifices 44 of stationary disc 16 are in fluid communication with the outlet port 32 through the wear sleeve 14.

The rotatable disc 18 has an outlet side 50 in contact with the stationary disc 16 and an inlet side 52 in contact with the rotatable cylinder 20. A pair of orifices 54 extend through the rotatable disc 18. The inlet side 52 of the rotatable disc 18 has a pair of pin holes (not shown) for connection of the rotatable disc 18 to the cylinder 20.

Continuing to refer to FIG. 1, the rotatable cylinder 20 has an open end 60 and a closed end 62. The open end 60 has an opening which extends into the cylinder 20 to form a chamber within the cylinder 20. The cylinder 20 has a sidewall 66 with a pair of diametrically opposed orifices 68 extending through the sidewall 66 into the chamber of the cylinder 20. Only one of the orifices 68 in the cylinder 20 is visible in FIG. 1. A pair of pins 70 extend from the open end 60 of the cylinder 20 and into the pin holes of the rotatable disc 18 to connect the cylinder 20 to the rotatable disc 18.

A valve stem 72 extends from the closed end 62 of the cylinder 20. The valve stem 72 has an end 74 which is square, hexagonal or the like for attachment of the hub 26.

The sleeve 22 is a tubular cylinder of stainless steel, steel alloy or the like. The sleeve 22 has an access end 80 and an outlet end 82 and a through bore 84 extending from the access end 80 to the outlet end 82. The outlet end 82 of the sleeve 22 has a pair of pins 86 for insertion into pin holes (not shown in FIG. 1) in the valve body 12 to prevent rotation of the sleeve 22. The sleeve 22 has a sidewall 88 with a pair of diametrically opposed orifices 90 extending into the bore 84. When installed within the valve body 12, the orifices 90 of the sleeve 22 are in fluid communication with the inlet port 30.

The bore 84 is shaped to matingly receive the cylinder 20 through the outlet end 82 of the sleeve 22. When the cylinder 20 is rotated within the bore 84 of the sleeve 22, the orifices 90 and 68 of the sleeve 22 and the cylinder 20, respectively, align in varying degree to change the amount of fluid communication between the inlet port 30 and the chamber of the cylinder 20.

With continued reference to FIG. 1, the cover 24 has an insertion portion 92 which fits into the valve body 12 through the access opening 34 and a flange 94 which engages the valve body 12 around the access opening 34. A pair of annular grooves 96 extend around the insertion portion 92 for installation of elastomeric O-rings to provide a fluid seal between the insertion portion 92 of the cover 24 and the valve body 12.

A valve stem bore 98 extends through the cover 24 to receive the valve stem 72 of the cylinder 20. A plurality of bolt holes 100 extend through the flange 94 of the cover 24 to receive bolts for fastening the cover 24 to the valve body 12.

The end 74 of the valve stem 72 protrudes through the cover 24 and the hub 26 is secured to the protruding end 74 of the valve stem 72. The hub 26 has an opening 102 shaped to mate with the square or hexagonal end 74 of the valve stem 72.

The hub 26 also has a pair of cross bores 104 to facilitate turning the hub 26 and valve stem 72. A bar may be inserted into one of the cross bores 104 to provide leverage to rotate the hub 26, valve stem 72, cylinder 20 and rotatable disc 18 to change flow control positions of the valve 10. An indicating band 106 is provided on the hub 26 to provide a visual indication of the flow control position of the valve 10.

Figure 2:
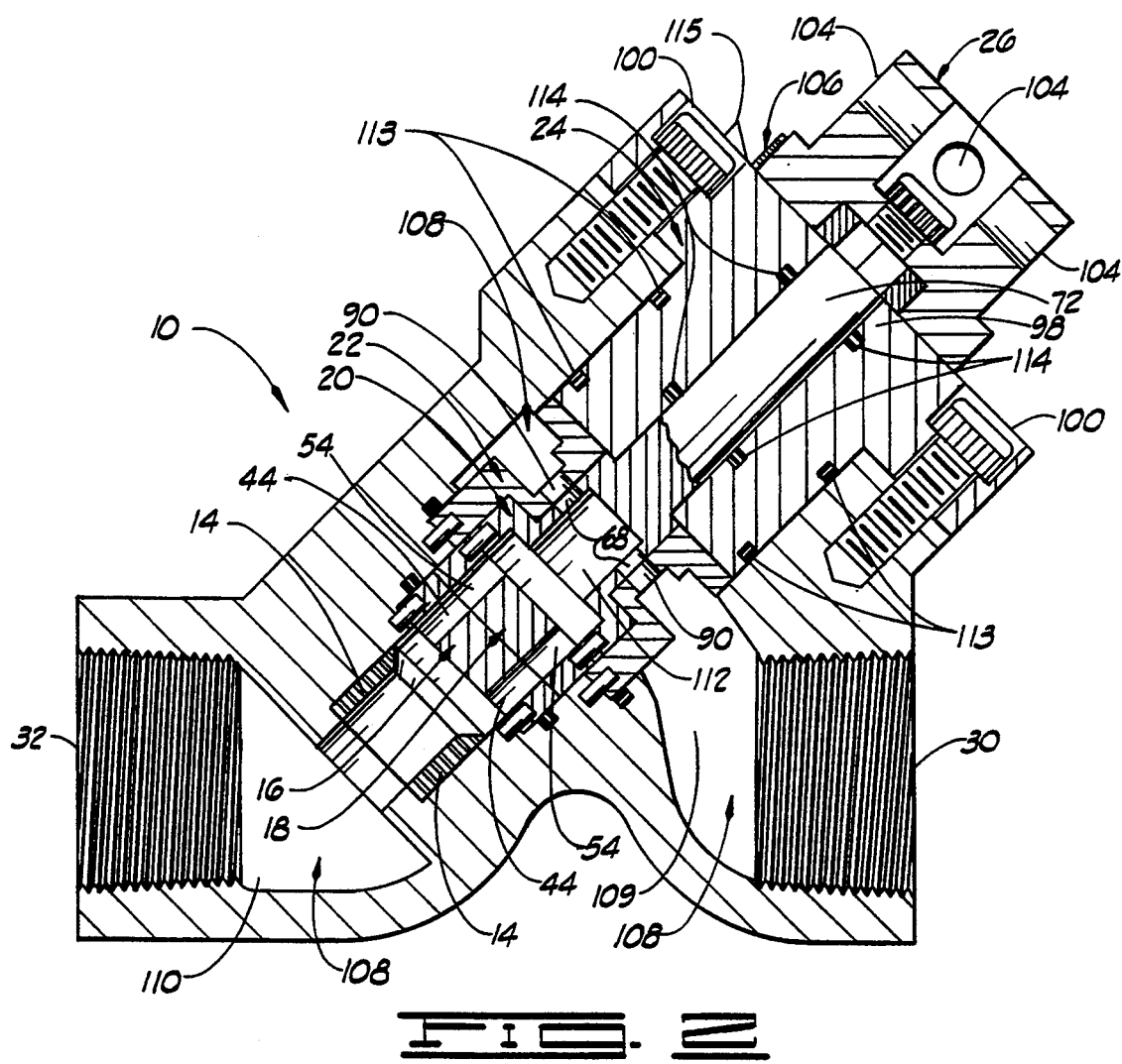
FIG. 2 is a partly diagrammatical, cross-sectional view of the flow control valve shown in FIG. 1.

Referring now to FIG. 2, the construction of the valve 10 is described in greater detail. The inlet port 30 and outlet port 32 are shown to be threaded. It should be appreciated, however, that the inlet port 30 and outlet port 32 may be connected to the flow line with bolted flanges or with any other conventional pipeline connecting arrangement.

A cavity 108 is formed in the valve body 12 to accommodate the components of the valve 10 and to allow fluid flow between the inlet port 30 at an inlet area 109 of the cavity 108 and the outlet port 32 at an outlet area 110 of the cavity 108. The cavity 108 communicates the access opening 34 as well as with the inlet port 30 and the outlet port 32.

As illustrated by FIG. 2, the inlet area 109 of the cavity 108 curves angularly upward from the inlet port 30 to the orifices 90 of the sleeve 22 and then angularly downward to the outlet port 32. Thus the path of fluid flow through the valve 10 is from the inlet port 30 through the orifices 90 of the sleeve 22 and the orifices 68 of the cylinder 20 into the chamber, designated by reference numeral 112, of the cylinder 20.

From the chamber 112 of the cylinder 20, the flow proceeds through the orifices 54 of the rotatable disc 18 and the orifices 44 of the stationary disc 16, through the wear sleeve 14 and out of the valve 10 through the outlet port 32.

Figure 3:
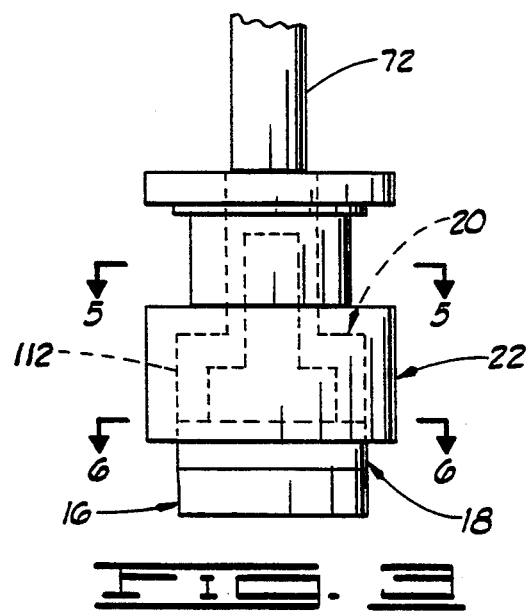
FIG. 3 is a side view of the sleeve, rotatable cylinder, stationary disc and rotatable disc of the flow control valve shown in FIG. 1.

As shown in FIGS. 2 and 3, the stationary disc 16 and the rotatable disc 18 fit against one another and the cylinder 20 fits closely within the sleeve 22. A portion of the rotatable disc 18 extends into the bore 84 of the sleeve 22. Thus the rotatable disc 18 is contiguous with the inside wall of the sleeve 22 and the inside wall of the valve body 12.

As illustrated by FIG. 2, the valve stem 72 of the cylinder 20 extends through the valve stem bore 98 of the cover 24. The cover 24 is bolted to the valve body 12 and abuts the sleeve 22 and cylinder 20 to secure the sleeve 22, the cylinder 20, and the discs 18 and 16 within the cavity 108 of the valve body 12.

As described previously, the cover 24 has annular grooves 96 for elastomeric O-ring seals 113 to provide a fluid seal between the cover 24 and the valve body 12. In addition, the valve stem bore 98 of the cover 24 has a pair of annular grooves for another set of elastomeric O-ring seals 114 to prevent fluid leakage between the valve stem 72 and the cover 24.

The hub 26 is attached to the end 74 of the valve stem 72 in any conventional manner. A threaded bolt, Allen screw or other such fastener may be used to secure the hub 26 to the valve stem 72.

As previously mentioned, the upper end of the hub 26 has the pair of cross bores 104 for turning the hub 26 and valve stem 72. To change the flow control position of the valve 10, an operator typically inserts a bar into one of the cross bores 104 in order to apply sufficient leverage to the hub 26. Of course, any suitable arrangement for turning the hub 26 and valve stem 72 may be employed.

Continuing to refer to FIG. 2, the flow control position indicator band 106 is attached to the outer surface of the hub 26 near the cover 24. A raised arrow 115, notch or mark is placed on the surface of the cover 24 to designate the flow position of the valve 10 on the indicator band 106.

Figure 4:
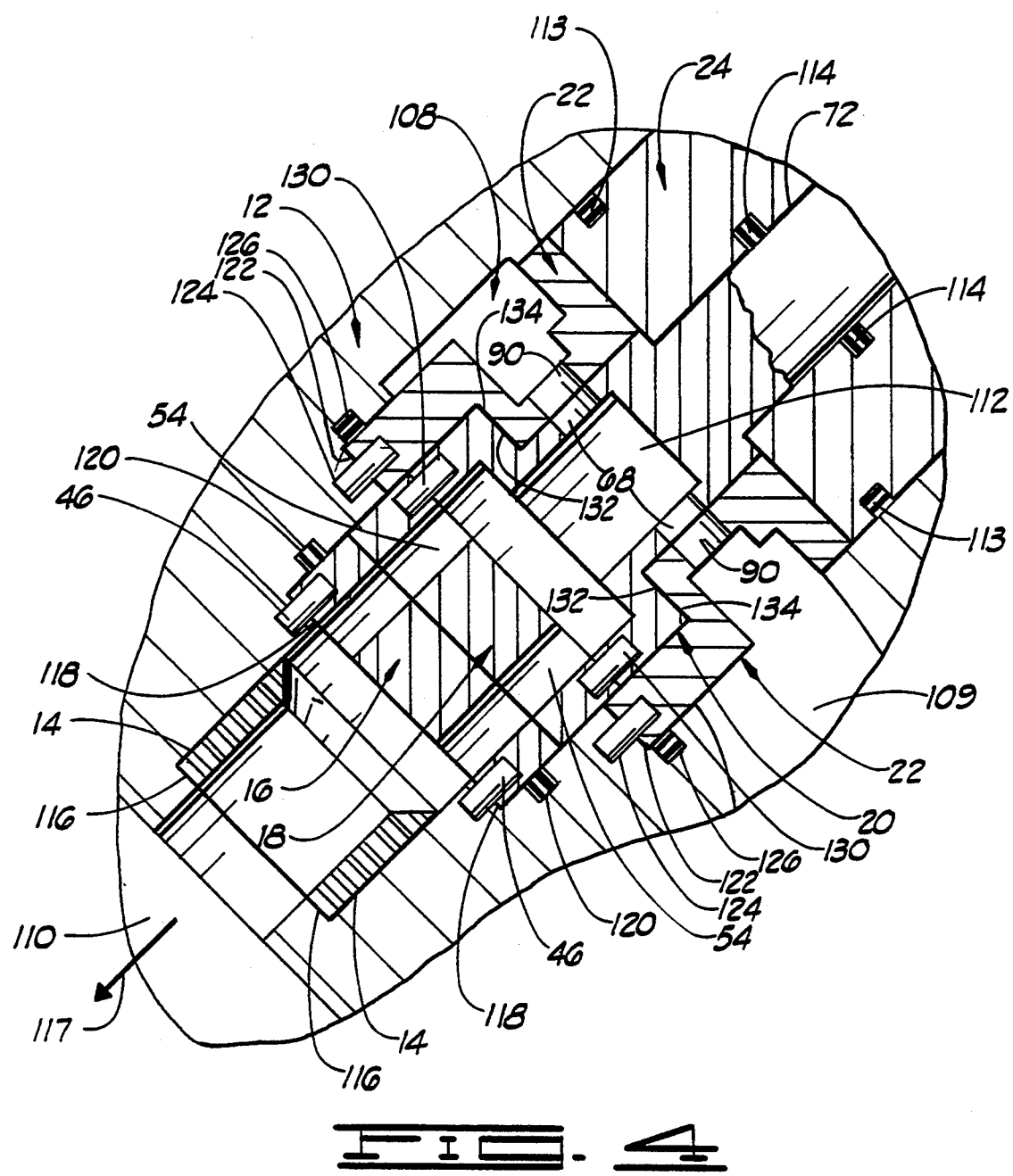
FIG. 4 is an enlarged view of a central portion of the flow control valve shown in FIG. 2.

Referring now to FIG. 4, the valve body 12 has an outlet annular shoulder 116 engaging the wear sleeve 14 to prevent movement of the wear sleeve 14 in the flow direction indicated by direction arrow 117. The wear sleeve 14 is typically pressed into position against the outlet annular shoulder 116, but may be held in place by pins (not shown) or other suitable securing arrangements.

The valve body 12 also has an intermediate annular shoulder 118 which engages the stationary disc 16 to prevent movement of the stationary disc 16 in the flow direction 117. The intermediate annular shoulder 118 has a pair of pin openings to receive the pins 46 extending from the stationary disc 16. The pins 46 keep the stationary disc 16 from rotating within the valve body 12.

An annular groove is formed in the valve body 12 to encircle a medial portion of the stationary disc 16. An elastomeric O-ring seal 120 is positioned within this groove to provide a fluid seal between the stationary disc 16 and the valve body 12.

With continued reference to FIG. 4, the valve body 12 has an inlet annular shoulder 122 engaging the sleeve 22 to prevent movement of the sleeve 22 in the flow direction 117. The inlet annular shoulder 122 has a pair of pin openings which receive sleeve pins 124 extending from the sleeve 22. The sleeve pins 124 extend into the pin openings of the inlet annular shoulder 122 and the sleeve 22 to prevent rotation of the sleeve 22.

The valve body 12 also includes an annular groove encircling a portion of the sleeve 22. An elastomeric O-ring seal 126 is placed in this annular groove to provide a fluid seal between the sleeve 22 and the valve body 12.

Focusing now on the cylinder 20 in FIG. 4, the cylinder 20 and the rotatable disc 18 are connected by a pair of pins 130. In this manner, rotating the cylinder 20 simultaneously rotates the rotatable disc 18.

Toward the inlet area 109 of the cavity 108, the chamber 112 of the cylinder 20 is reduced in diameter by a reducing shoulder 132. The sleeve 22 has a reducing shoulder 134 which matingly receives the reducing shoulder 132 of the cylinder 20.

Turning now to FIGS. 5 through 5c, several flow control positions of the cylinder 20 and sleeve 22 are described. When the cylinder 20 is in a closed position such as that shown in FIG. 5, there is no fluid communication between the orifices 90 of the sleeve 22 and the orifices 68 of the cylinder 20. Therefore no fluid flows through the orifices 90 of the sleeve 22 and the orifices 68 of the cylinder 20 into the chamber 112 of the cylinder 20.

Referring to FIG. 5a, a nearly open position of the cylinder 20 and sleeve 22 is shown. The cylinder 20 has been rotated to position the orifices 68 of the cylinder 20 to be in near fluid communication with the orifices 90 of the sleeve 22.

A partially open position of the cylinder 20 and sleeve 22 is illustrated by FIG. 5b. In this position, about fifty percent of the area of the cylinder orifices 68 are open to the sleeve orifices 90. Fluid flows through the sleeve orifices 90 and cylinder orifices 68 into the chamber 112 of the cylinder 20 at about half the maximum flow rate of the valve 10.

Finally, the fully open position of the sleeve 22 and cylinder 20 is shown in FIG. 5c. In this position, the sleeve orifices 90 and cylinder orifices 68 are in complete alignment and maximum fluid flow occurs through the orifices 90 and 68 into the chamber 112 of the cylinder 20.

Positions of the rotatable disc 18 and stationary disc 16, comparable to those of the sleeve 22 and cylinder 20, are shown in FIGS. 6 through 6c. In these drawing figures, it should be appreciated that the stationary disc 16 is positioned beneath the rotatable disc 18 and is, for the most part, not visible. In FIGS. 6, 6a and 6b, the orifices 44 of the stationary disc 16 are shown in broken lines.

Referring first to FIG. 6, a fully closed position of the rotatable disc 18 and stationary disc 16 is described. In this closed position, there is no fluid communication between the orifices 54 of the rotatable disc 18 and the orifices 44 of the stationary disc 16.

A nearly open position of the rotatable disc 18 and the stationary disc 16 is illustrated by FIG. 6a. The rotatable disc 18 has been turned to a position where the orifices 54 of the rotatable disc 18 are almost open to the orifices 44 of the stationary disc 16.

With reference now to FIG. 6b, a partially open position of the rotatable disc 18 and stationary disc 16 is shown. The rotatable disc 18 has been turned to place the orifices 54 of the rotatable disc 18 in fluid communication with the orifices 44 of the stationary disc 16. In this position, the valve 10 is about fifty percent open for fluid flow from the chamber 112 of the cylinder 20 to the outlet port 32.

The fully open position of the rotatable disc 18 and stationary disc 16 is illustrated by FIG. 6c. In this position, the orifices 54 of the rotatable disc 18 completely align with the orifices 44 of the stationary disc 16. Thus this position allows maximum flow through the orifices 54 and 44 to the outlet port 32.

It should be understood that the cylinder 20 and the rotatable disc 18 are connected for simultaneous rotation. With this construction, when the sleeve orifices 90 and cylinder orifices 68 are closed (FIG. 5), the disc orifices 54 and 44 are also closed (FIG. 6). Similarly, when the sleeve orifices 90 and cylinder orifices 68 are half open (FIG. 5b), the disc orifices 54 and 44 are half open (FIG. 6b). In other words, the degree of fluid communication through the cylinder orifices 68 and sleeve orifices 90 is substantially equal to the degree of fluid communication through the rotatable disc orifices 54 and the stationary disc orifices 44 at all times.

With reference now to FIG. 7, the position indicator band 106 is described. The indicator band 106 has a scale 140 which shows the range of valve positions. The scale 140 is expressed in percent open, from zero percent open to one-hundred percent open. The position indicator band 106 may also have a scale 142 which shows the equivalent diameter corresponding to the area of fluid flow through the two sets of orifices. The arrow 115 or marker on the cover 24 points to the scales 140 and 142 on the indicator band 106 to provide visual indicia of the flow control position the valve 10.

Operation

In operation, the flow control position of the valve 10 is changed by turning the hub 26. As the hub 26 is turned, the valve stem 72 and cylinder 20 rotate to change the relative positions of the cylinder orifices 68 and the sleeve orifices 90. Turning the hub 26 changes the flow allowed from the inlet port 30 into the chamber 112 of the cylinder 20 by increasing or decreasing the area of fluid communication through the sleeve orifices 90 and cylinder orifices 68.

Because the rotatable disc 18 is linked to the cylinder 20, the rotatable disc 18 turns with the cylinder 20. Rotation of the rotatable disc 18 changes the relative positions of the rotatable disc orifices 54 and the stationary disc orifices 44. Thus turning the hub 26 also changes the flow allowed from the chamber 112 of the cylinder 20 to the outlet port 32 through the disc orifices 54 and 44.

Returning now to FIGS. 2 and 4, installation of the various components in the valve 10 is described. With the cover 24 unbolted and removed from the access opening 34, the wear sleeve 14 is first installed. As mentioned previously, the wear sleeve 14 may be pressed into position or may be held in place with securing pins (not shown).

Next the stationary disc 16 is installed with the pins 46 extending into the pin openings of the valve body 12 to prevent rotation of the stationary disc 16. The elastomeric O-ring seal 120 is secured in place to provide a fluid seal between the stationary disc 16 and the valve body 12.

The rotatable disc 18, the cylinder 20 and the sleeve 22 are inserted next. The pins 130 link the rotatable disc 18 with the cylinder 20 and the pins 124 prevent rotation of the sleeve 22. The elastomeric O-ring 126 is installed to provide a fluid seal between the sleeve 22 and the valve body 12.

Then the cover 24 is installed with the valve stem 72 journaled through the valve stem bore 98 of the cover 24. The elastomeric O-rings 114 are placed in their respective annular grooves before the cover 24 is installed. The cover 24 is secured to the valve body 12 with bolts. Finally, the hub 26 is attached to the end 74 of the valve stem 72 to complete the installation of valve components.

Removal of the valve components is basically a reversal of the installation procedure. It may be desired to remove valve components to replace worn parts or to change the size of the orifices.

It should be appreciated that the construction of the valve 10 allows easy replacement of any of the components. With the top entry design, the valve 10 need not be disconnected from the flow line in order to replace valve components. Moreover, the use of securing pins to assemble the stationary disc 16, rotatable disc 18, the cylinder 20 and the sleeve 22 allows individual or group replacement of these valve components.

Furthermore, it should be understood that the valve 10 may be constructed for numerous ranges of pressure drops by varying the relative sizes, shapes and locations of the discs 16 and 18, the disc orifices 44 and 54, the chamber 112 of the rotatable cylinder 20, and the cylinder orifices 68 and sleeve orifices 90.

EMBODIMENT OF FIGS. 8 THROUGH 17 AND 20

Figure 8:
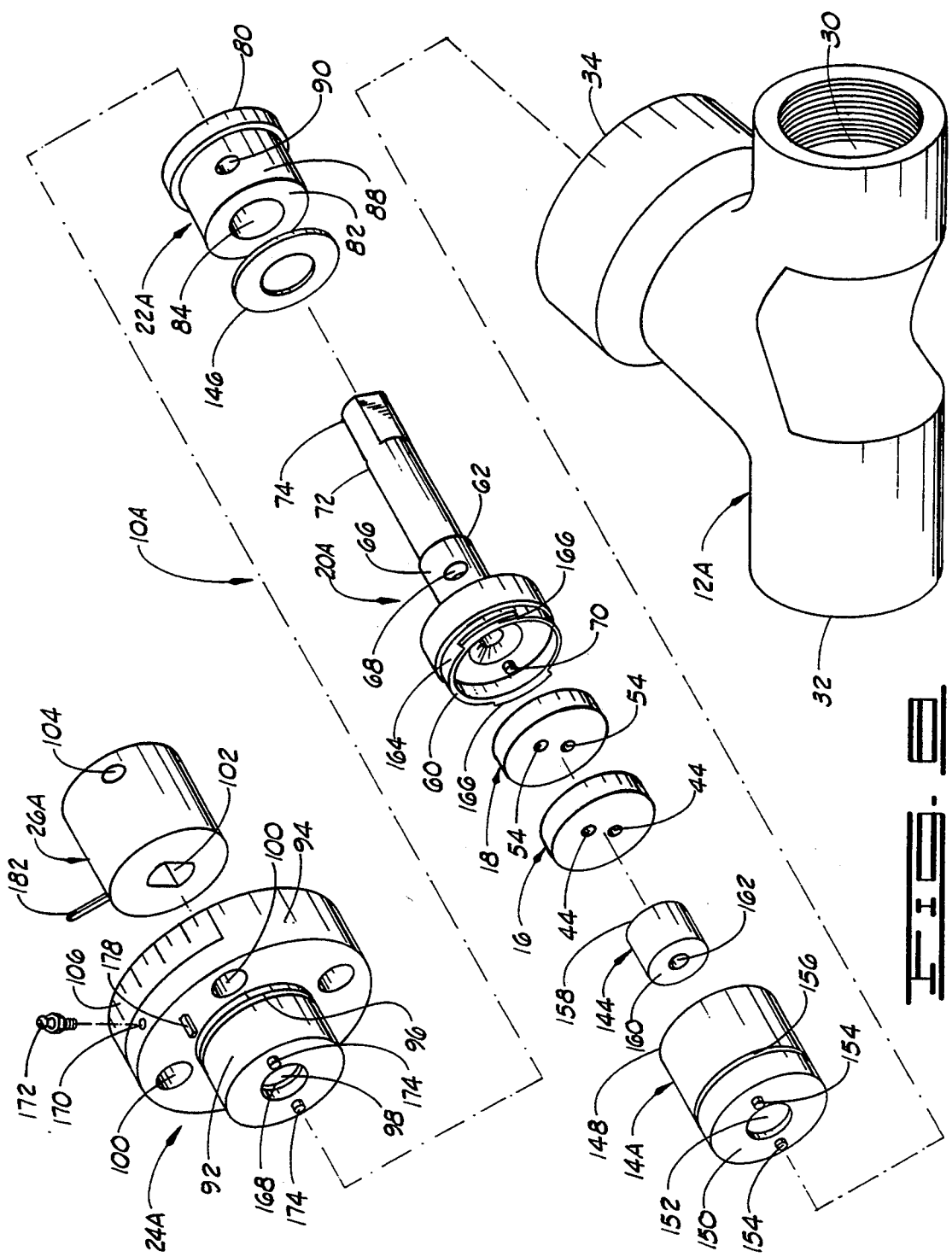
FIG. 8 is an exploded perspective view of an alternate embodiment of a flow control valve constructed in accordance with the present invention.
Figure 14:
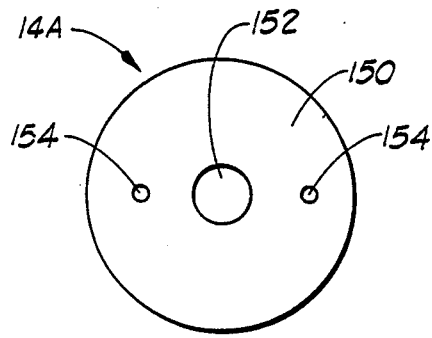
FIG. 14 is a bottom plan view of the wear sleeve in the valve of FIG. 8.

Referring now to FIG. 8, shown therein and designated by reference character 10A is an alternate embodiment of a flow control valve constructed in accordance with the present invention. The valve 10A comprises a valve body 12A, a wear sleeve 14A, a wear insert 144, a stationary disc 16, a rotatable disc 18, a rotatable cylinder 20A, a thrust washer 146, a sleeve 22A, a cover 24A and a hub 26A.

The wear sleeve 14A has an inlet end 148, an outlet end 150 and a flow bore 152 extending through the wear sleeve 14A from the inlet end 148 to the outlet end 150. A pair of securing pins 154 protrude from the outlet end 150 of the wear sleeve 14A. An annular groove 156 circumscribes the wear sleeve 14A. The annular groove 156 is sized and shaped to receive an elastomeric ring seal (not shown) for providing a fluid-tight seal between the wear sleeve 14A and the valve body 12A.

The wear insert 144 is sized and shaped to fit into the wear sleeve 14A through the inlet end 148 of the wear sleeve 14A. The wear insert 144 has an inlet end 158, an outlet end 160 and its own flow bore 162 extending through it from the inlet end 158 to the outlet end 160. Typically made of tungsten carbide, the wear insert 144 is provided to protect the wear sleeve 144 from cavitation from fluid flow therethrough.

The stationary disc 16 with orifices 44 and the rotatable disc 18 with orifices 54 have been described hereinabove. In the assembly of valve 10, the stationary disc 16 is secured by pins to the valve body 12. The stationary disc 16 in valve 10A, however, is shaped to fit into the wear sleeve 14A and is connected by pins to the wear sleeve 14A.

The rotatable cylinder 20A is similar to the cylinder 20 in that it has the open end 60, closed end 62, sidewall 66 with cylinder orifices 68, pins 70, valve stem 72 and valve stem end 74. It should be appreciated that the valve stem end 74 may hexagonal, as described hereinabove, or flat on two opposite sides, as shown in FIG. 8.

Unlike cylinder 20, the open end 60 of the rotatable cylinder 20A has a reduced diameter end portion 164 with a pair of cylinder flanges 166 which protrude radially outward 20A. Typically, the two cylinder flanges 166 are diametrically opposed and each cylinder flange 166 extends for approximately, but less than, one-fourth of the circumference of the reduced diameter portion 164 of the rotatable cylinder 20A.

The thrust washer 146 is positioned between the rotatable cylinder 20A and the sleeve 22A to prevent wear on these two components from repeated rotations of the cylinder 20A. The thrust washer 146 may be made from any suitable substance having a low coefficient of friction.

The sleeve 22A is similar to the sleeve 22 in construction and exactly like sleeve 22 in function. The sleeve 22A comprises sidewall 88, access end 80, outlet end 82 and sleeve bore 84 extending through the sleeve 22A from the access end 80 to the outlet end 82. Like sleeve 22, two diametrically opposed sleeve orifices 90 extend through the sidewall 88 into the sleeve bore 84.

Turning now to the valve cover 24A and valve hub 26A, the valve cover 24A includes insertion portion 92, flange portion 94, ring seal groove 96, valve stem bore 98, bolt holes 100 and indicator band 106. A pair of ring seal grooves 168 are located in the valve stem bore 98 to receive elastomeric seals for effecting a fluid-tight seal between the valve stem 72 and the valve cover 24A. One of the valve stem bore grooves 168 is visible in FIG. 8.

A grease bore 170 extends from the side of the flange portion 94 into the valve stem bore 98 to allow injection of lubricants into the valve stem bore 98. A grease fitting 172 is provided to close the grease bore 170.

A pair of valve cap pins 174 extend from the end of the insertion portion 92 of the valve cover 24A. The pins 174 are positioned for insertion into corresponding holes 176 (not shown in FIG. 8) in the access end 80 of the sleeve 22A when the valve cover 24A and sleeve 22A are correctly aligned. This pin 174 and hole 176 arrangement not only ensures proper installation of the valve cover 24A and sleeve 22A, but also prevents rotational movement of the installed sleeve 22A.

An indexing pin 178 protrudes from the under surface of the flange portion 94 of the valve cover 24A. The indexing pin 178 is located for insertion into an indexing hole 180 (not shown in FIG. 8) in the valve body 12A when the valve cover 24A and sleeve 22A are in proper alignment. This indexing arrangement ensures that the actual position of the valve 10A corresponds to the position indicated by the indicator band 106.

The valve hub 26A is very similar to the valve hub 26. The hub 26A has valve stem opening 102, which is shaped to mate with the valve stem end 74, and cross bore 104 for insertion of a tool for turning the hub 26A. The hub 26A includes an indicator pin 182 which extends radially from the sidewall of the hub 26A to point to the position of the valve 10A on the indicator band 106.

With reference now to FIGS. 9 through 13, various views of the rotatable cylinder 20A are shown therein. As best shown in FIGS. 9 and 10, the rotatable cylinder 20A includes the valve stem 72, a mid-portion 184 having the sidewall 66 with the cylinder orifices 68, the open end 60 portion with the cylinder flanges 166 and a collar portion 186 between the mid-portion 184 and the open end 60 portion.

The collar portion 186 of the rotatable cylinder 20A has a greater diameter than the open end 60 portion. As best illustrated by FIG. 12, the flanges 166 typically do not extend outwardly as far as the outer edge of the collar portion 186.

As shown in FIG. 13, the rotatable cylinder 20A has a flow chamber 188 which communicates with the open end 60 and the cylinder orifices 68. At the open end 60, the flow chamber 188 defines a disc chamber 190, which is sized and shaped to matingly receive the rotatable disc 18. Within the disc chamber 190, the rotatable cylinder 20A has a sidewall 192 and an upper wall 194.

An annular groove 196 extends around a medial area of the sidewall 192 in the disc chamber 190 to receive an elastomeric ring seal (not shown), which provides a fluid tight seal between the sidewall 192 of the cylinder 20A and the rotatable disc 18.

A pair of cylinder pins 198 extend from the upper wall 194 of the cylinder 20A into the disc chamber 190. When the rotatable disc 18 is properly installed in the disc chamber 190, each cylinder pin 198 is inserted into a corresponding pin hole in the rotatable disc 18. Thus the pins 198 of the rotatable cylinder 20A and the pin holes of the rotatable disc 18 cooperate to ensure that the rotatable disc 18 is positioned properly and that the rotatable disc 18 rotates with rotation of the cylinder 20A.

Figure 15:
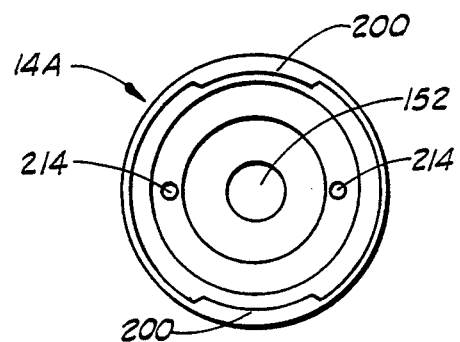
FIG. 15 is a top plan view of the wear sleeve of FIG. 14.
Figure 16:
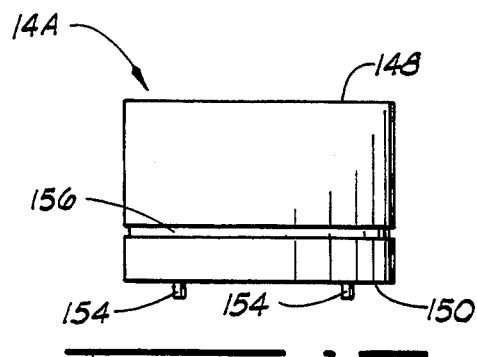
FIG. 16 is a side elevation of the wear sleeve of FIG. 14.

Turning now to FIGS. 14 through 17, various views of the wear sleeve 14A are shown therein. As best shown in FIG. 15, the inlet end 148 of the wear sleeve 14A includes a pair of diametrically opposed and inwardly extending wear sleeve flanges 200. Each wear sleeve flange 200 extends along approximately one-fourth the circumference of the inlet end 148 of the wear sleeve 14A.

Figure 17:
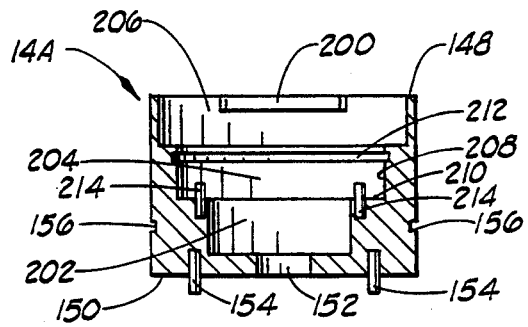
FIG. 17 is a cross-sectional view of FIG. 16.

As best illustrated by FIG. 17, the flow path through the wear sleeve 14A has four different diameters to define four distinct areas. Progressing from the outlet end 150 to the inlet end 148, the four areas are the outlet bore 152, a wear insert chamber 202, a stationary disc chamber 204 and an inlet chamber 206.

The outlet bore 152 is the area having the smallest diameter and opens to the outlet end 150 of the wear sleeve 14A. The wear insert chamber 202 has a larger diameter than the outlet bore 152 and is sized and shaped to receive the wear insert 144 with the wear insert bore 162 in fluid communication with the outlet bore 152.

The stationary disc chamber 204, defined by a sidewall 208 and a lower wall 210, has a diameter which is greater than that of the wear insert chamber 202 and is sized and shaped to receive the stationary disc 16. An annular groove 212 extends around a medial portion of the sidewall 208. The annular groove 212 is sized and shaped to receive an elastomeric ring seal (not shogun in FIG. 17) to effect a fluid tight seal between the stationary disc 16 and the sidewall 208 of wear sleeve 14A within the disc chamber 204.

A pair of disc chamber pins 214 extend from the lower wall 210 of the wear sleeve 14A into the disc chamber 204. Each pin 214 is positioned to fit into one of the pin holes in the stationary disc 16. The insertion of the pins 214 of the wear sleeve 14A into the pin holes of the stationary disc 16 ensures proper positioning of the stationary disc 16 and its orifices 44 in the valve 10A.

The inlet chamber 206 is greater in diameter than the disc chamber 204 and is open at the inlet end 148 of the wear sleeve 14A. The inlet chamber 206 is sized and shaped to receive the open end 60 portion of the rotatable cylinder 20A. The wear sleeve flanges 200 extend into the inlet chamber 206 at the inlet end 148 of the wear sleeve 14A, as illustrated by the wear sleeve flange 200 shown in FIG. 17.

Figure 20:
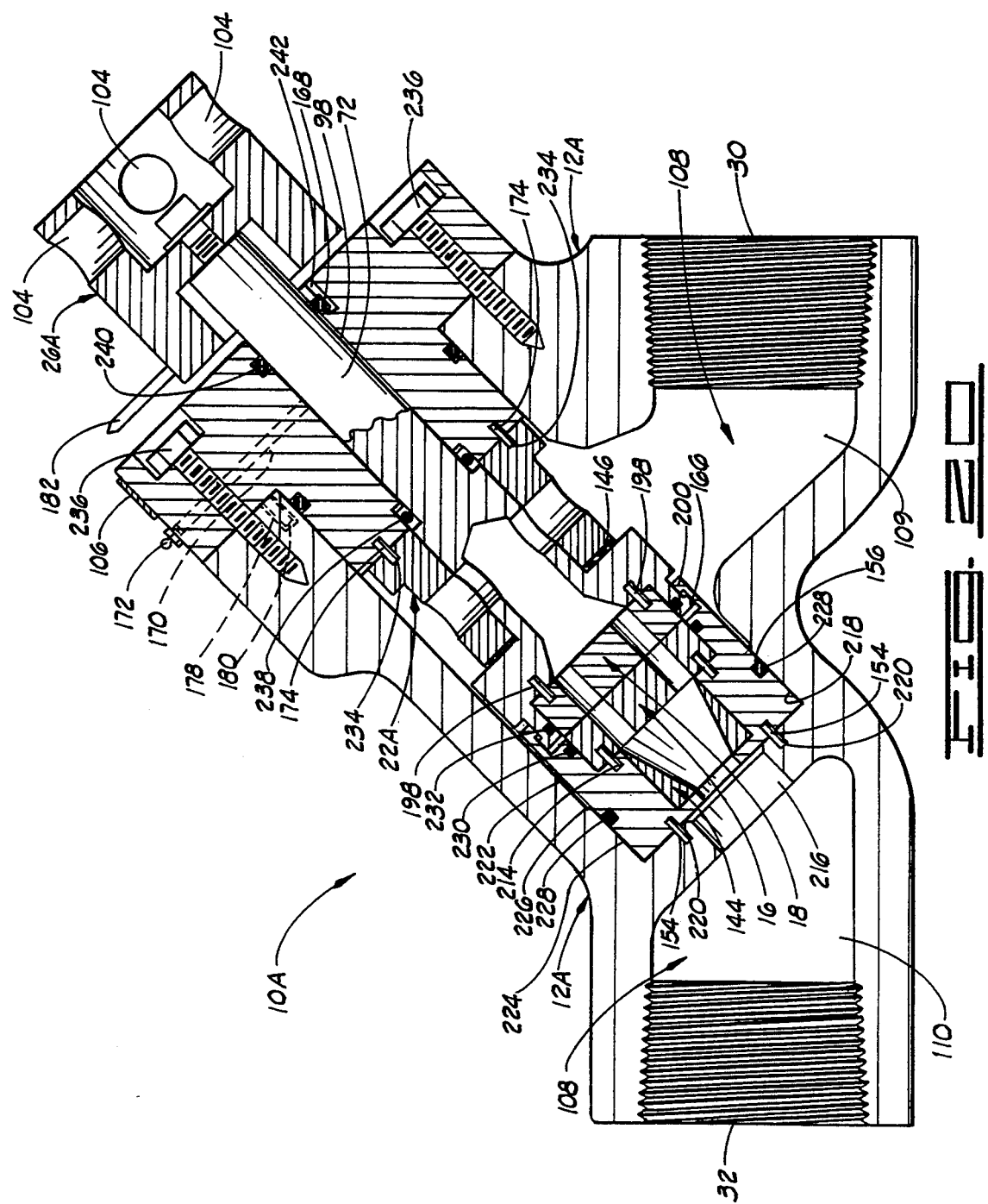
FIG. 20 is a partly sectional, partly diagrammatical view of the valve of FIG. 8 showing the valve assembled for operation.

Turning now to FIG. 20, shown therein is the valve 10A assembled for operation. The valve body 12A is provided with the outlet area 110, an outlet bore 216 and a wear sleeve bore 218. A pair of pin holes 220 are located in the valve body 12A within the wear sleeve bore 218 to receive the securing pins 154 of the wear sleeve 14A. It should be appreciated that the securing pins 154 of the wear sleeve 14A and the pin holes 220 in the valve body 12A are positioned to ensure proper alignment of the wear sleeve 14A in the valve 10A.

The wear sleeve bore 218 is machined for a tight fit with the wear sleeve 14A. Because of this tight fit, it may be difficult to rotate the wear sleeve 14A within the wear sleeve bore 218 to align the securing pins 154 with the pin holes 220 as the wear sleeve 14A is being installed.

In order to overcome this difficulty, the wear sleeve bore 218 is constructed to have a first portion 222 and a second portion 224 separated by a beveled area 226 of the valve body 12A. The second portion 224 extends from the outlet bore 216 beyond the installed position of annular groove 156 of the wear sleeve 14A and has a diameter which mates tightly with the wear sleeve 14A. The first portion 222, on the other hand, has a slightly larger diameter than the second portion 224.

As the wear sleeve 14A is being installed, it may be easily rotated to the proper alignment while in the first portion 222 of the wear sleeve bore 218. Once aligned, the wear sleeve 14A is pushed into the second portion 224 of the wear sleeve bore 218 with the securing pins 154 being inserted into the pin holes 220 of the valve body 12A. An elastomeric ring seal 228 positioned in the annular groove 156 of the wear sleeve 14A effects a fluid tight seal between the wear sleeve 14A and the valve body 12A in the second portion 224 of the wear sleeve bore 218.

The disc chamber pins 214 of the wear sleeve 14A are inserted into pin holes of the stationary disc 16 to prevent rotational movement of the stationary disc 16. An elastomeric ring seal 230 is positioned in the annular groove 212 of the wear sleeve 14A to provide a fluid tight seal between the stationary disc 16 and the wear sleeve 14A.

The flanges 166 of the rotatable cylinder 20A and the flanges 200 of the wear sleeve 14A are shown in an overlapping arrangement in FIG. 20. It should be appreciated, however, that the flanges 166 and 200 may overlap each other completely, partially, or not at all, depending on the position of rotation of the rotatable cylinder 20A. It should also be understood that the flanges 166 and 200 cooperate to allow the rotatable cylinder 20A to be rotated without impediment.

The pins 198 of the rotatable cylinder 20A are inserted into pin holes of the rotatable disc 18 to ensure that the rotatable disc 18 turns in response to turning of the rotatable cylinder 20A. An elastomeric ring seal 232 is placed into the annular groove 196 to provide a fluid tight seal between the side surface of the rotatable disc 18 and the rotatable cylinder 20A.

The thrust washer 146 is positioned between the rotatable cylinder 20A and the sleeve 22A. As mentioned previously, the thrust washer 146 is provided to reduce wear on the rotatable cylinder 20A and the sleeve 22A from the repetitive turning of the rotatable cylinder 20A.

The pins 174 of the cover 24A are inserted into a corresponding pair of pin holes 234 of the sleeve 22A to prevent rotation of the sleeve 22A. Of course, the cover 24A is held stationary by the bolts 236 inserted through bolt-holes 100 and screwed into corresponding threaded bolt-holes in the valve body 12A.

An elastomeric ring seal is located in each of the two valve stem grooves 168 of the valve cover 24A. A lower seal 238 is provided to prevent fluid leakage from the valve cavity 108 and into the valve stem bore 98. An upper seal 240 is located toward the top of the valve cover 24A to seal the valve stem bore 98 against entry of substances from the outside environment.

Under normal conditions, the lower seal 238 holds all the fluid pressure and there is no pressure on the upper seal 240. In the abnormal event of pressure on the upper seal 240, a pressure relief bore 242 is provided to relieve such pressure. The pressure relief bore 242 extends from the top of the valve cover 24A and intersects with the upper groove 168 in the valve stem bore 98. A pressure on the bottom side of the upper seal 240 may be relieved around the upper seal 240 and out of the valve 10A through the pressure relief bore 242.

As illustrated by FIG. 20, the grease bore 170 extends from the side of the valve cover 24A into the valve stem bore 98 at a point between the upper seal 240 and the lower seal 238. With the introduction of a suitable lubricant into the valve stem bore 98 through the grease bore 170, the friction between the valve stem 72 and the valve cover 24A is reduced and the rotatable cylinder 20A may be turned more easily.

As indicated by the dashed lines 178 and 180, the indexing pin 178 of the valve cover 24A protrudes into an indexing hole 180 in the valve body 12A. It should be appreciated that the indexing pin 178 of the valve cover 24A and the indexing hole 180 in the valve body 12A are positioned such that the wear sleeve 14A, the rotatable cylinder 20A and the sleeve 22A are in proper alignment in order for the indexing pin 178 to be inserted into the indexing hole 180.

In order to replace the discs 16 and 18 and the wear insert 144, it is necessary to remove both the rotatable cylinder 20A and the wear sleeve 14A from the valve body 12A. Without some means for linking the wear sleeve 14A to the rotatable cylinder 20A, the rotatable cylinder 20A comes out of the valve body 12A by itself and a suitable extraction tool is needed to pull the wear sleeve 14A from the valve body 12A.

The flanges 166 and 200 solve this problem by allowing the rotatable cylinder 20A to be pulled by itself or together with the wear sleeve 14A. By turning the rotatable cylinder 20A to a position wherein the flanges 166 are disposed in the spaces between the flanges 200 of the wear sleeve 14A, the rotatable cylinder 20A may be extracted from the valve body 12A without the wear sleeve 14A.

If it is desired to remove the wear sleeve 14A from the valve body 12A with the rotatable cylinder 20A, the rotatable cylinder 20A is turned to a position wherein the flanges 166 and 200 overlay one another. In this position, the flanges 166 of the rotatable cylinder 20A engage the flanges 200 of the wear sleeve 14A as the rotatable cylinder 20A is pulled and the wear sleeve 14A comes out of the valve body 12A with the rotatable cylinder 20A.

EMBODIMENT OF FIGS. 18 AND 19

Figure 18:
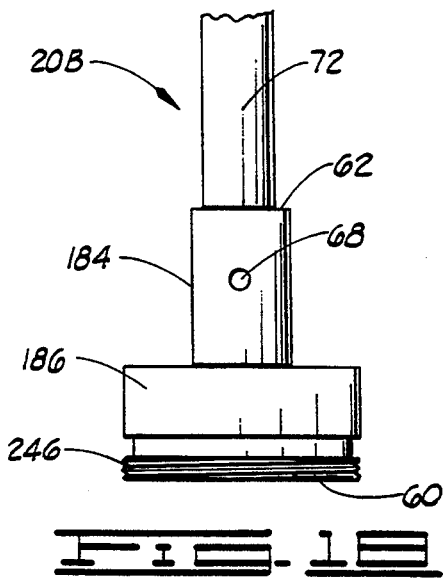
FIG. 18 is a side elevation of a portion of an alternate, threaded embodiment of the rotatable cylinder in the valve of FIG. 8.
Figure 19:
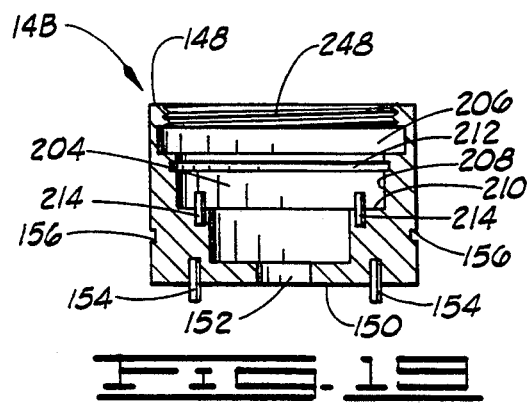
FIG. 19 is a cross-sectional view of an alternate, threaded embodiment of the wear sleeve in the valve of FIG. 8.

Turning now to FIGS. 18 and 19, shown therein and designated by reference characters 20B and 14B, respectively, are alternate embodiments of the rotatable cylinder and wear sleeve used in a valve 10B. In this particular embodiment, the flanges 166 and 200 of the rotatable cylinder 20A and wear sleeve 14A are replaced by sets of threads.

As shown in FIG. 18, the rotatable cylinder 20B is just like the rotatable cylinder 20A except that the flanges 166 are replaced by a set of male threads 246. Although any suitable threaded arrangement may be used, the threads 246 typically extend all the way around a portion of the open end 60 of the rotatable cylinder 20B.

As illustrated by FIG. 19, the wear sleeve 14B is exactly like the wear sleeve 14A, except that the flanges 200 are replaced by a set of female threads 248. The female threads 248 of the wear sleeve 14B are adapted to mate with the male threads 246 of the rotatable cylinder 20B. In addition, the inlet chamber 206 of the wear sleeve 14B is sized and shaped such that the male threads 246 of the rotatable cylinder 20B may be loosely disposed therein.

To install the rotatable disc 20B and wear sleeve 14B at once, the male threads 246 of the rotatable cylinder 20B are screwed into the female threads 248 of the wear sleeve 14B. The rotatable cylinder 20B and the wear sleeve 14B are then inserted together into the valve body 12A.

The rotatable cylinder 20B is turned to align the securing pins 154 of the wear sleeve 14B with the pin holes 220 in the valve body 12A. Once the wear sleeve 14B is properly aligned, the rotatable cylinder 20B and wear sleeve 14B are pushed downward to insert the pins 154 of the wear sleeve 14B into the pin holes 220 of the valve body 12A.

After the wear sleeve 14B is seated properly, the threads 246 of the rotatable cylinder 20B are screwed past the threads 248 of the wear sleeve 14B and into the inlet chamber 206 of the wear sleeve 14B. With the threads 246 disposed within the inlet chamber 206, the rotatable cylinder 20B is free to be turned to adjust the operation position of the valve 10B. The other components of the valve 10B are assembled in the manner described hereinabove for the valve 10A.

For removal from the valve body 12A, the rotatable cylinder 20B and wear sleeve 14B may be removed together by leaving the threads 246 of the rotatable cylinder 20B in the inlet chamber 206 of the wear sleeve 14B and pulling the rotatable cylinder 20B from the valve body 12A. If it is desired to remove the rotatable cylinder 20B by itself, the threads 246 of the rotatable cylinder 20B may be unscrewed out of the wear sleeve 14B before extracting the rotatable cylinder 20B from the valve body 12A.

EMBODIMENT OF FIGS. 21 THROUGH 26 AND 28

Referring now to FIGS. 21 through 26 and 28, shown therein and designated by reference character 10C is another embodiment of a valve constructed in accordance with the present invention. The valve 10C includes the valve body 12A, the wear sleeve 14A, the wear insert 144, the stationary disc 16, the rotatable disc 18, a rotatable cylinder 20C, the thrust washer 146, the valve cover 24A and the valve hub 26A.

Each of these components have been described hereinabove, with the exception of the rotatable cylinder 20C. The rotatable cylinder 20C is identical to the rotatable cylinder 20A, except for the mid-portion 184C. First, the mid-portion 184C of rotatable cylinder 20C is larger in diameter than the mid-portion 184 of the rotatable cylinder 20A. Secondly, the mid-portion 184C of the rotatable cylinder 20C has a plurality of orifices 250 therethrough rather than the pair of opposing orifices 66 for the rotatable cylinder 20A.

The rotatable cylinder 20C is shown separately in FIGS. 22 through 25. As illustrated by these drawing figures, the rotatable cylinder 20C is structured exactly like the rotatable cylinder 20A except for the mid-portion 184C.

With reference now to FIG. 28, shown therein is the assembled valve 10C. The assembly is the same as that described for the valve 10A hereinabove. The basic differences between the valve 10A and the valve 10C are: (1) there is no sleeve 22A in the valve 10C and (2) the rotatable cylinder 20C in valve 10C is sized and shaped to take up the space vacated by the sleeve 22A.

Because there is no sleeve 22A in the valve 10C, the thrust washer 146 in valve 10C is disposed between the valve cover 24A and the rotatable cylinder 20C. Thus the thrust washer 146 in the valve 10C reduces wear between the valve cover 24A and the rotatable cylinder 20C.

It should be appreciated that the inlet area 109 of the valve 10C is in fluid communication with the cylinder chamber 188 of the rotatable cylinder 20C at all times through the orifices 250. The rotatable cylinder 20C may be provided with more or larger orifices 250 to allow greater fluid flow from the inlet area 109 into the cylinder chamber 188. Conversely, the rotatable cylinder 20C may be provided with fewer or smaller orifices 250 to restrict fluid flow from the inlet area 109 into the cylinder chamber 188.

Fluid flow through the valve 10C is controlled in much the same manner as that described hereinabove. Fluid travels from the inlet area 109 of the valve 10C through the orifices 250 into the cylinder chamber 188. The rotatable cylinder 20C is turned to place the rotatable disc 18 in the desired flow control position. The degree of alignment between the orifices 54 of the rotatable disc 18 with the orifices 44 of the stationary disc 16 determines the amount of flow allowed into the outlet area 110 of the valve 10C.

EMBODIMENT OF FIG. 27

Turning back to FIG. 27, shown therein and designated by reference character 20D is an alternate embodiment of the rotatable cylinder. The rotatable cylinder 20D is a threaded version of the rotatable cylinder 20C for use with the threaded wear sleeve 14B, which is shown in FIG. 19 and is described hereinabove.

As shown in FIG. 27, the rotatable cylinder 20D is exactly like the rotatable cylinder 20C, except that the flanges 166 are replaced by a set of male threads 252. The threads 252 of the rotatable cylinder 20D cooperate with the threads 248 of the wear sleeve 14B in the manner described hereinabove.

EMBODIMENT OF FIGS. 29 AND 30

Referring now to FIGS. 29 and 30, shown therein and designated by reference character 260 is a disc having orifices 262 substantially triangular in shape. The disc 260 may be used for the stationary disc 16 or rotatable disc 18 in any of the embodiments disclosed herein.

As illustrated by FIG. 29, one side of the disc 260 has a pair of holes 264 for the insertion of securing pins. The holes 264 extend only part of the way into the disc 260.

The triangular orifices 262, on the other hand, extend all the way through the disc 260. When the disc 260 is used for the stationary disc 16 and the rotatable disc 18, the flow control characteristics are different from the circular orifices. Compared with the circular orifices, the triangular orifices 262 increase the flow more quickly near the closed position and more slowly near the fully open position.

It should be appreciated that the circular and triangular orifices are only two examples of the shape which the orifices of the stationary disc 16 and the rotatable disc 18 may have. The orifices of the stationary disc 16 and the rotatable disc 18 may have any of a wide variety of shapes and sizes to produce different flow control characteristics. Moreover, the orifices of the sleeve 22 or 22A and the rotatable cylinders 20, 20A, 20B, 20C and 20D may have any of a wide variety of shapes and sizes as well.

In addition, variations may be made in the securing pins and their corresponding pin holes in any of the embodiments disclosed herein. The pins may be separate units, which are inserted into opposing holes in the two components being connected together by the pins. Alternatively, the pins may be integral to or rigidly attached to one of the components and positioned for insertion into corresponding pin holes in the other component.

Changes may be made in the combinations, operations and arrangements of the various parts and elements described herein without departing from the spirit and scope of the invention as defined in the following claims.

What is claimed is:

1. A flow control valve comprising:
a body having a sidewall, an inlet port, an outlet port and a cavity communicating with the inlet port and the outlet port;
a rotatable cylinder positioned within the cavity and having an open end, a closed end and a sidewall, the open end extending into said cylinder to define a chamber, the sidewall of said cylinder having a plurality of cylinder orifices therethrough into the chamber and an access opening communicating with the cavity of said body;
a pair of discs positioned within the cavity, each one of said discs having a plurality of orifices therethrough, one of said discs being rotatable with said cylinder and the other of said discs being substantially stationary;
a wear sleeve positioned within the cavity of said body, said wear sleeve having an inlet end, an outlet end and a flow opening extending therethrough from the inlet end to the outlet end thereof, the flow opening communicating with the orifices of said stationary disc;
a plurality of cylinder flanges extending from the open end of said cylinder; and
a plurality of wear sleeve flanges extending from the inlet end of said wear sleeve;
wherein said cylinder is rotatable to locate said cylinder flanges between said wear sleeve flanges such that said cylinder and said wear sleeve are separately insertable into and removable from said body and wherein said cylinder is rotatable to overlap said cylinder flanges with said wear sleeve flanges such that said cylinder and said wear sleeve are insertable into and removable from said body together.

2. A flow control valve comprising:
a body having a sidewall, an inlet port, an outlet port and a cavity communicating with the inlet port and the outlet port;
a rotatable cylinder positioned within the cavity and having an open end, a closed end and a sidewall, the open end extending into said cylinder to define a chamber, the sidewall of said cylinder having a plurality of cylinder orifices therethrough into the chamber and an access opening communicating with the cavity of said body;
a pair of discs positioned within the cavity, each one of said discs having a plurality of orifices therethrough, one of said discs being rotatable with said cylinder and the other of said discs being substantially stationary;
a wear sleeve positioned within the cavity, said wear sleeve having an inlet end, an outlet end and a flow opening extending therethrough from the inlet end to the outlet end thereof, the flow opening communicating with the orifices of said stationary disc;
a set of cylinder threads located on the open end of said cylinder; and
a set of wear sleeve threads within the flow opening of said wear sleeve at the inlet end of said wear sleeve, said wear sleeve threads being adapted to mate with said cylinder threads;
wherein said cylinder is rotatable to unscrew said cylinder threads from said wear sleeve threads such that said cylinder and said wear sleeve are separately insertable into and removable from said body and wherein said cylinder is rotatable to mate said cylinder threads with said wear sleeve threads such that said cylinder and said wear sleeve are insertable into and removable from said body together.

3. A flow control valve comprising:
a body having a sidewall, an inlet port, an outlet port and a cavity communicating with the inlet port and the outlet port;
a pair of discs positioned within the cavity, each disc having a plurality of orifices therethrough, one of said discs being stationary and the other of said discs being rotatable between an open position wherein the orifices of said discs allow fluid flow therethrough and a closed position wherein the orifices of one disc are unaligned with the orifices of the other disc to prevent fluid flow through the cavity of said body;

a sleeve secured within the cavity of said body and having a bore therethrough and a sidewall with a plurality of sleeve orifices extending therethrough into the bore of said sleeve;

a cylinder positioned within the cavity and having an open end, a closed end and a sidewall, the open end extending into said cylinder to define a chamber, the sidewall having a plurality of cylinder orifices therethrough into the chamber, said cylinder being rotatable between an open position wherein the cylinder orifices and the sleeve orifices allow fluid flow therethrough and a closed position wherein the cylinder orifices are unaligned with the sleeve orifices to prevent fluid flow through the cavity of said body; and a wear sleeve positioned in the cavity of said body, said wear sleeve having an inlet end, an outlet end and a bore extending therethrough from the inlet end to the outlet end, said wear sleeve also having a counterbore in the inlet end of the bore, the counterbore being sized and shaped to receive at least a portion of said stationary disc.

4. The flow control valve of claim 3 further comprising:

a wear insert positioned within the flow opening of said wear sleeve, said wear insert having a bore therethrough.

5. A flow control valve comprising:

a body having a sidewall, an inlet port, an outlet port and a cavity communicating with the inlet port and the outlet port;

a pair of discs positioned within the cavity, each one of said discs having a plurality of orifices therethrough, one of said discs being rotatable between an open position wherein the orifices of said discs allow fluid flow therethrough and a closed position wherein the orifices of one disc are unaligned with the orifices of the other disc to prevent fluid flow through the cavity of said body;

a sleeve secured within the cavity of said body and having a bore therethrough and a sidewall with a plurality of sleeve orifices extending therethrough into the bore of said sleeve;

a cylinder positioned within the cavity and having an open end, a closed end and a sidewall, the open end extending into said cylinder to define a chamber, the sidewall of said cylinder having a plurality of cylinder orifices therethrough into the chamber, said cylinder being rotatable between an open position wherein the cylinder orifices and the sleeve orifices allow fluid flow therethrough and a closed position wherein the cylinder orifices are unaligned with the sleeve orifices to prevent fluid flow through the cavity of said body;

a wear sleeve positioned in the cavity of said body, said wear sleeve having an inlet end, an outlet end and a bore extending therethrough from the inlet end to the outlet end thereof;

a plurality of cylinder flanges extending from the open end of said cylinder; and a plurality of wear sleeve flanges extending from the inlet end of said wear sleeve;

wherein said cylinder is rotatable to a cylinder-only removal position wherein said cylinder flanges are positioned between said wear sleeve flanges and a complete removal position wherein said wear sleeve flanges overlap said cylinder flanges.

6. A flow control valve comprising:

a body having a sidewall, an inlet port, an outlet port and a cavity communicating with the inlet port and the outlet port;

a pair of discs positioned within the cavity, each one of said discs having a plurality of orifices therethrough, one of said discs being rotatable between an open position wherein the orifices of said discs allow fluid flow therethrough and a closed position wherein the orifices of one disc are unaligned with the orifices of the other disc to prevent fluid flow through the cavity of said body;

a sleeve secured within the cavity of said body and having a bore therethrough and a sidewall with a plurality of sleeve orifices extending therethrough into the bore of said sleeve;

a cylinder positioned within the cavity and having an open end, a closed end and a sidewall, the open end extending into said cylinder to define a chamber, the sidewall of said cylinder having a plurality of cylinder orifices therethrough into the chamber, said cylinder being rotatable between an open position wherein the cylinder orifices and the sleeve orifices allow fluid flow therethrough and a closed position wherein the cylinder orifices are unaligned with the sleeve orifices to prevent fluid flow through the cavity of said body;

a wear sleeve positioned in the cavity of said body, said wear sleeve having an inlet end, an outlet end and a bore extending therethrough from the inlet end to the outlet end thereof;

a set of cylinder threads located on the open end of said cylinder; and a set of wear sleeve threads in the bore of said wear sleeve at the inlet end of said wear sleeve, said wear sleeve threads being adapted to mate with said cylinder threads;

wherein said cylinder is rotatable between a cylinder only removal position wherein said cylinder threads are unscrewed from said wear sleeve threads and a wear sleeve removal position wherein said cylinder threads are screwed into or past said wear sleeve threads.

7. A flow control valve comprising:

a body having a sidewall, an inlet port, an outlet port and a cavity communicating with the inlet port and the outlet port;

a pair of discs positioned within the cavity, each disc having a plurality of orifices therethrough, one of said discs being rotatable between an open position wherein the orifices of said discs allow fluid flow therethrough and a closed position wherein the orifices of one disc are unaligned with the orifices of the other disc to prevent fluid flow through the cavity of said body;

a rotatable cylinder positioned within the cavity and having an open end, a closed end and a sidewall, the open end extending into said cylinder to define a chamber, the sidewall having a plurality of cylinder orifices therethrough into the chamber;

a wear sleeve positioned in the cavity of said body, said wear sleeve having an inlet end, an outlet end and a bore extending therethrough from the inlet end to the outlet end; and means for appending said wear sleeve to said cylinder by rotating said cylinder.

8. The flow control valve of claim 7 wherein said means for appending comprises:

a plurality of cylinder flanges extending from the open end of said cylinder; and a plurality of wear sleeve flanges extending from the inlet end of said wear sleeve;

wherein said cylinder is rotatable to a cylinder-only removal position wherein said cylinder flanges are positioned between said wear sleeve flanges and a wear sleeve removal position wherein said wear sleeve flanges overlap said cylinder flanges.

9. The flow control valve of claim 7 wherein said means for appending comprises:

a set of cylinder threads located on the open end of said cylinder; and a set of wear sleeve threads in the bore of said wear sleeve at the inlet end of said wear sleeve, said wear sleeve threads being adapted to mate with said cylinder threads;

wherein said cylinder is rotatable between a cylinder-only removal position wherein said cylinder threads are unscrewed from said wear sleeve threads and a wear sleeve removal position wherein said cylinder threads are screwed into or past said wear sleeve threads.

10. The flow control valve of claim 7 wherein said wear sleeve has a counterbore. in the inlet end of the bore, the counterbore being sized and shaped to receive at least a portion of said stationary disc.

11. The flow control valve of claim 7 further comprising:

a sleeve secured within the cavity of said body and having a bore shaped to receive said cylinder, said sleeve having a sidewall with a plurality of sleeve orifices extending therethrough into the bore of said sleeve;

wherein said cylinder is rotatable between an open position wherein the cylinder orifices and the sleeve orifices allow fluid flow therethrough and a closed position wherein the cylinder orifices are unaligned with the sleeve orifices to prevent fluid flow through the cavity of said body.

* * * * *